United States Patent Office 3,332,913
Patented July 25, 1967

3,332,913
THERMALLY STABLE COPOLYMERS OF ALDE-HYDES AND EPOXIDES
Robert D. Lundberg, St. Albans, W. Va., assignor to Union Carbide Corporation, a corporation of New York
No Drawing. Filed Nov. 2, 1964, Ser. No. 408,382
38 Claims. (Cl. 260—67)

This application is a continuation-in-part application of application Ser. No. 247,809, entitled, "Thermally Stable Copolymers of Acetaldehyde and Ethylene Oxide," filed Dec. 28, 1962, now abandoned.

This invention relates to copolymers of aldehydes and epoxides having high thermal stability.

Homopolymers of acetaldehyde and other aldehydes are known to be useful in the production of molded and extruded objects. However, these polymers are of limited value because of their poor thermal stability and the ease with which they undergo degradation to aldehyde monomer and polymers of lower molecular weight.

It has now been discovered, in accordance with the instant invention, that aldehyde polymers having superior resistance to thermal degradation can be produced by the copolymerization of an epoxide having a vicinal epoxy group into the polyaldehyde molecules. The thermal stability of the polymer is dramatically improved as a result, while none of the other properties, such as water insolubility in the case of polyacetaldehyde, are adversely affected. The novel copolymers of this invention can be molded and fabricated at higher temperatures, and exposed to elevated temperatures for longer periods, than can conventional aldehyde polymers, and will remain stable for at least a year at room temperature without suffering any marked changes in physical appearnce.

The novel copolymers of the instant invention contain (a) recurring oxide units of the formula

wherein R is a monovalent organic radical containing carbon and hydrogen atoms, i.e. a hydrocarbon radical, wherein the carbon atom adjacent the aldehyde moiety is aliphatic (including cycloaliphatic), which radical can also contain oxygen and halogen atoms, and (b) recurring oxide units of the formula

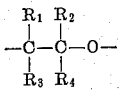

wherein $R_1$, $R_2$, $R_3$, and $R_4$, when taken individually, each represent hydrogen or monovalent organic radicals containing carbon and hydrogen atoms, i.e. hydrocarbon radicals, which radicals can also contain oxygen and halogen atoms, while any two of $R_1$, $R_2$, $R_3$, and $R_4$, when attached to different carbon atoms and taken collectively, represent a divalent hydrocarbon radical which together with the terminal carbon atoms to which they are attached make up a monocyclic radical having from 4 to about 10 carbon atoms, preferably from 4 to 8 carbon atoms, which monocyclic radical can be substituted with monovalent organic radicals containing carbon and hydrogen atoms, and optionally oxygen and halogen atoms, provided, however, that the monocyclic radical and its substituents contain no more than about 10 carbon atoms. When $R_1$, $R_2$, $R_3$, and $R_4$ are taken individually and are other than hydrogen, they each can have from 1 to about 12 carbon atoms, preferably from 1 to 6 carbon atoms, while R can have from 1 to about 12 carbon atoms, preferably from 1 to 4 carbon atoms.

The oxygen atoms present in the radicals designated by R, $R_1$, $R_2$, $R_3$, and $R_4$ above, can be in the form of etheric oxygen or esteric oxygen, i.e. ether or ester groups can be present. When these radicals are free of such oxygen containing moieties, they represent, in those situations where they designate radicals other than hydrogen, hydrocarbon and halo-substituted hydrocarbon radicals such as alkyl, haloalkyl, alkenyl, haloalkenyl, aryl, haloaryl, cycloalkyl, halocycloalkyl, aralkyl, alkaryl, and the like, except that R cannot designate groups such as aryl, haloaryl, and alkaryl, as it must have an aliphatic carbon atom adjacent the aldehyde moiety. Among the radicals which R, $R_1$, $R_2$, $R_3$, and $R_4$ can represent are methyl, ethyl, n-propyl, n-butyl, isobutyl, n-pentyl, n-hexyl, cyclohexyl, 2-ethylhexyl, n-dodecyl, vinyl, allyl, benzyl, phenethyl, and the like. $R_1$, $R_2$, $R_3$, and $R_4$ can also represent in addition to the above, such radicals as phenyl, tolyl, p-chlorophenyl, p-bromophenyl, m-ethylphenyl, and the like.

The epoxides employed in producing the copolymers of the instant invention have a single vicinal epoxy group and are free of other functional groups which are reactive under the polymerization conditions employed. Epoxides having more than one vicinal epoxy group can be employed, if desired; however, such epoxides lead to the production of cross-linked polymers. The epoxides suitable for use can be represented by the formula

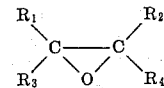

wherein $R_1$, $R_2$, $R_3$, and $R_4$ are as above defined. Representative of the various type epoxides included within such formula are the alkylene oxides, the epoxyalkenes, the aliphatic haloepoxides, the cycloalkyl-substituted alkylene oxides, the aryl-substituted alkylene oxides, the alkaryl-substituted alkylene oxides, the haloaryl-substituted alkylene oxides, the aryloxy-substituted alkylene oxides, the epoxycycloalkanes, the alkenyl-substituted epoxycycloalkanes, the cycloalkoxy-substituted epoxycycloalkanes, and the like. Illustrative of the many epoxides which can be employed are ethylene oxide,
1,2-epoxypropane,
3-bromo-1,2-epoxypropane,
3-chloro-1,2-epoxypropane,
1,2-epoxybutane,
2,3-epoxybutane,
3-chloro-1,2-epoxybutane,
1,4-dichloro-2,3-epoxybutane,
3,4-dichloro-1,2-epoxybutane,
4-chloro-2,3-epoxybutane,
3,4-epoxy-1-butene,
1-chloro-3,4-epoxy-1-butene,
1,2-epoxypentane,
3-ethyl-2,3-epoxypentane,
4-cyclohexyl-2,3-epoxypentane,
1-chloro-2,3-epoxypentane,
4-chloro-2,3-epoxypentane,
3-chloro-1,2-epoxypentane,
1,4-dichloro-2,3-epoxypentane,
3,4-epoxy-1-pentene,
1-chloro-2,3-epoxyhexane,
5-benzyl-2,3-epoxyheptane,
5-butyl-3,4-epoxyoctane,
1,2-epoxynonane,
1,2-epoxydecane,
1,2-epoxydodecane,
epoxycyclopentane,
epoxycyclohexane,
2,3-epoxymethylcyclohexane,
3,4-epoxyethylcyclohexane, 1,4-epoxyvinylcyclohexane,
poxycycloheptane,
tyrene oxide, p-chlorostyrene oxide,
-ethylstyrene oxide,
enzylethylene oxide,
lycidyl acrylate,
henyl glycidyl ether,
,3-epoxycyclopentyl cyclopentyl ether,
-methyl-3,4-epoxycyclohexylmethyl acetate, and the like.

The aldehydes employed in producing the copolymers f the instant invention have a single aldehyde group and re free of other functional groups which are reactive nder the polymerization conditions employed. Aldehydes aving more than one aldehyde group can be employed, desired; however, as in the case of epoxides having ore than one vicinal epoxy group, such aldehydes lead the production of cross-linked polymers. The aldehydes uitable for use can be represented by the formula

R—CHO herein R is as above defined. Representative of the many ldehydes which can be employed are acetaldehyde, proionaldehyde, butyraldehyde, isobutyraldehyde, crotonldehyde, valeraldehyde, caproaldehyde, 2-pentenaldeyde, 2,4-pentadienaldehyde, enanthaldehyde, hendecanalehyde, 1-cyclohexene-1-carboxaldehyde, cinnamaldeyde, 2-furaldehyde, and the like.

The copolymers of the instant invention are prepared y contacting a mixture containing from 1 mole percent 99 mole percent, preferably from 30 mole percent to 0 mole percent, of a suitable aldehyde, and from 1 mole ercent to 99 mole percent, preferably from 20 mole pernt to 70 mole percent, of a suitable epoxide, with a oly(hydrocarbylaluminum oxide) catalyst. Such copolyers can contain from 10 mole percent to 99.99 mole pernt of combined aldehyde and from 0.01 mole percent 90 mole percent of combined epoxide. Usually these opolymers contain from 90 mole percent to 99.9 mole ercent of combined aldehyde and from 0.1 mole percent 10 mole percent of combined epoxide.

The poly(hydrocarbylaluminum oxide) catalysts emoyed in copolymerizing aldehydes and epoxides accordg to the instant invention consist of recurring units hich can be represented by the general formula

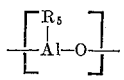

herein $R_5$ is an alkyl radical containing from 1 to about carbon atoms, such as methyl, ethyl, propyl, isopropyl, tyl, isobutyl, t-butyl, pentyl, neopentyl, hexyl, 2-methylntyl, heptyl, octyl, isooctyl, 2-ethylhexyl, 5,5-dimethylxyl, nonyl, decyl, isodecyl, undecyl, dodecyl, and the e, or an aryl radical, such as phenyl, benzyl, tolyl, naphyl, and the like.

The poly(hydrocarbylaluminum oxide) compounds emoyed as catalysts are produced by the reaction of water th hydrocarbylaluminum compounds which contain at ast one hydrocarbyl radical attached to the aluminum om. The term "hydrocarbyl" as used in this application nifies an alkyl radical or an aryl radical as defined ove. The reaction of water with the hydrocarbylalumim compound is preferably carried out by adding the ter to a solution of the hydrocarbylaluminum comund in an anhydrous, inert, organic solvent. The conntration of the hydrocarbylaluminum compound in the lvent can vary from about 5 percent by weight, or less, as high as about 75 percent by weight, or more. Suite organic solvents include among others, saturated aliatic hydrocarbons such as hexane, heptane, petane, isotane, purified kerosene, and the like; saturated cycloaliatic hydrocarbons such as cyclopentane, cyclohexane, ethylcyclopentane, dimethylcyclopentane, and the like; omatic hydrocarbons such as benzene, toluene, xylene, d the like; chlorinated hydrocarbons such as methylene chloride, and the like; and ethers such as diethyl ether, vinyl n-butyl ether, tetrahydrofuran, dioxan, and the like. The only requirement in the selection of the inert, organic solvent is that it be liquid at the reaction temperature and that it does not react with the water or the hydrocarbylaluminum compound charged, or interfere with the reaction in any way whatsoever.

The hydrocarbylaluminum compounds suitable for use as starting materials in the preparation of the poly(hydrocarbylaluminum oxide) catalysts can be represented by the general formula R—Al—R′$_2$ wherein R is as above defined, and R′ is an alkyl radical containing from 1 to about 12 carbon atoms, an aryl radical, or a hydrogen atom. Among the hydrocarbylaluminum compounds that can be used as starting materials are the trialkylaluminum compounds, the triarylaluminum compounds, the dialkylaluminum hydrides, the monoalkylaluminum dihydrides, and the like. Illustrative thereof are such compounds as trimethylaluminum, triethylaluminum, tripropylaluminum, tri-n-butylaluminum, triisobutylaluminum, trihexylaluminum, trioctylaluminum, tridodecylaluminum, triphenylaluminum, trinaphthylalminum, tritolylaluminum, dimethylaluminum hydride, diisobutylaluminum hydride, dihexylaluminum hydride, diphenylaluminum hydride, monoethylaluminum dihydride, monobutylaluminum dihydride, monooctylaluminum dihydride, and the like.

The poly(hydrocarbylaluminum oxide) catalyst can be prepared by slowly adding the necessary amount of water to the hydrocarbylaluminum compound. This addition of water is carried out at a temperature of from about 0° C. to about 100° C., preferably at a temperature of from about 10° C. to about 65° C.

The amount of water added to the hydrocarbylaluminum compound to produce the poly(hydrocarbylalluminum oxides) can be varied from about 0.25 mole to about 3 moles of water per mole of hydrocarbylaluminum compound. The preferred range, however, is from about 0.85 to about 1.05 moles of water per mole of hydrocarbylaluminum compound. While this range is preferred, the broader range can be employed, but it has been found that when the amount of water employed is outside of the preferred range, the poly(hydrocarbylaluminum oxide) compound produced is not as satisfactory a product for use as a catalyst. It has also been found that when an amount of water in excess of 1 mole is employed, some alumina is formed which either precipitates out of solution or forms a gel.

The amount of poly(hydrocarbylaluminum oxide) employed as catalyst can be varied over a wide range. In general, the catalyst is admixed with the aldehyde and epoxide in an amount of from about 0.1 percent by weight to about 10 percent by weight, preferably from about 0.5 percent by weight to about 2 percent by weight, of the total weight of these two compounds. The inert organic solvents employed in producing the poly(hydrocarbylaluminum oxide) catalysts also serve as diluents for the polymerization.

Polymerization according to the process of the instant invention readily occurs at temperatures ranging from −130° C. to 0° C. Preferably, polymerization is effected at temperatures ranging from −80° C. to −50° C.

Polymerization is usually effected at atmospheric pressure as a matter of convenience. However, pressures both above and below atmospheric pressure, for example pressures ranging from as low as 0.5 atmosphere, or lower, to as high as 1000 atmospheres, or higher, can also be employed.

After the polymerization reaction is complete, the polymer is separated from the reaction mixture and dried. This can be accomplished in the manner illustrated by the examples.

The copolymers of the instant invention are thermoplastic resins which can be molded and extruded to produce shaped articles, and used in the preparation of films and coatings.

The following examples are set forth for purposes of illustration so that those skilled in the art may better understand this invention, and it should be understood that they are not to be construed as limiting this invention in any manner.

EXAMPLE I

A clean, dry reaction flask was flushed with dry, oxygen-free nitrogen and fitted with a serum cap. Ninety (90) milliliters of dry, oxygen-free heptane, which had been passed through a dry silica gel column and purged with dry, oxygen-free nitrogen, was injected into the reaction flask with a hypodermic syringe. An 8-gram portion of triisobutylaluminum (40 millimoles) was similarly added. A hypodermic needle attached to a nitrogen line feed with a mineral oil bubbler was inserted into the serum cap to relieve pressure due to the isobutane evolved during the reaction. While continually agitating, 0.71 milliliter of water (about 40 millimoles) was slowly added from a hypodermic syringe at a temperature of about 45° C. and over a period of about 25 minutes. The reaction product produced was poly(isobutylaluminum oxide).

EXAMPLE II

To a nitrogen-purged 100-milliliter round-bottom flask were charged, under a nitrogen atmosphere, 45 milliliters of acetaldehyde (0.810 mole) and 5 milliliters of ethylene oxide (0.10 mole). The flask was stoppered and cooled in a Dry Ice bath. After the contents of the flask had cooled to the temperature of the bath, the stopper was removed and 2 milliliters of a 1 molar solution of poly(isobutylaluminum oxide) in heptane (prepared in a manner similar to Example I) were added under a nitrogen atmosphere. The flask was restoppered and placed in a Dry Ice-acetone bath for 48 hours. At the end of this time, the flask was opened and isooctane was added to the contents thereof. The resulting mixture was filtered, and the precipitate collected was dried at room temperature. About 7.4 grams of a tough, translucent copolymer of acetaldehyde and ethylene oxide were obtained.

After heating a 0.1986 gram portion of the copolymer in a forced air oven for 60 minutes at a temperature of 100° C., 28 percent of the copolymer remained.

When 50 milliliters of acetaldehyde (0.89 mole) was homopolymerized in the same manner, only 19 percent of the polymer remained after heating a 0.1921 gram sample of the homopolymer in a forced air oven for 60 minutes at a temperature of 100° C.

EXAMPLE III

The procedure of Example II was repeated employing 35 milliliters of acetaldehyde (0.62 mole), 15 milliliters of ethylene oxide (0.30 mole), and 2 milliliters of a 1 molar solution of poly(isobutylaluminum oxide) in heptane.

About 6.2 grams of a tough, translucent copolymer of acetaldehyde and ethylene oxide were obtained. After heating a 0.2011 gram portion of the copolymer in a forced air oven for 60 minutes at a temperature of 100° C., 44 percent of the copolymer remained.

EXAMPLE IV

The procedure of Example II was repeated employing 25 milliliters of acetaldehyde (0.45 mole), 25 milliliters of ethylene oxide (0.50 mole), and 2 milliliters of a 1 molar solution of poly(isobutylaluminum oxide) in heptane.

About 5.7 grams of a tough, translucent copolymer of acetaldehyde and ethylene oxide were obtained. After heating a 0.2007 gram portion of the copolymer in a forced air oven for 60 minutes at a temperature of 100° C., 56 percent of the copolymer remained.

EXAMPLE V

The procedure of Example II was repeated employing 15 milliliters of acetaldehyde (0.27 mole), 35 milliliters of ethylene oxide (0.70 mole), and 2 milliliters of a 1 molar solution of poly(isobutylaluminum oxide) in heptane.

About 3.2 grams of a tough, translucent copolymer of acetaldehyde and ethylene oxide were obtained. After heating a 0.2036 gram portion of the copolymer in a forced air oven for 60 minutes at a temperature of 100° C., 71 percent of the copolymer remained.

EXAMPLE VI

To a polymerization tube equipped with a stopcock were charged 25.2 grams of acetaldehyde (0.57 mole), 2.5 grams of ethylene oxide (0.06 mole), and 0.5 milliliter of a 2.3 molar solution of poly(isobutylaluminum oxide) in heptane. The tube was connected via the stopcock to a high vacuum apparatus and 0.1299 millimole (0.0057 gram) of labeled ethylene oxide which had an activity of 382 microcuries per millimole was added. The tube was sealed and placed in a Dry Ice-acetone bath for 48 hours. At the end of this time, the tube was opened and isooctane was added to the contents thereof. The precipitate produced thereby was a copolymer of acetaldehyde and ethylene oxide. The precipitate was washed several times with isooctane, collected, and dried under vacuum. The precipitate was analyzed for radioactivity after combustion and found to have an activity of $3.7 \times 10^{-6}$ microcuries per milligram of copolymer (corrected for background radiation). This indicated that the copolymer had an ethylene oxide content of about 0.02 percent by weight.

EXAMPLE VII

The procedure of Example VI was repeated employing 14.1 grams of acetaldehyde (0.32 mole), 12.3 grams of ethylene oxide (0.28 mole), 0.5 milliliter of a 2.3 molar solution of poly(isobutylaluminum oxide) in heptane, and 0.1104 millimole (0.005 gram) of labeled ethylene oxide which had an activity of 382 microcuries per millimole.

The copolymer of acetaldehyde and ethylene oxide which was recovered had a radioactivity of $2 \times 10^{-5}$ microcuries per milligram of copolymer (corrected for background radiation). This indicated that the copolymer had an ethylene oxide content of 0.6 percent by weight.

EXAMPLE VIII

The procedure of Example VI was repeated employing 8.2 grams of acetaldehyde (0.19 mole), 16.5 grams of ethylene oxide (0.38 mole), 0.5 milliliter of a 2.3 molar solution of poly(isobutylaluminum oxide) in heptane, and 0.1297 millimole (0.006 gram) of labeled ethylene oxide which had an activity of 382 microcuries per millimole.

The copolymer of acetaldehyde and ethylene oxide which was recovered had a radioactivity of $1.3 \times 10^{-5}$ microcuries per milligram of copolymer (corrected for background radiation). This indicated that the copolymer had an ethylene oxide content of 0.4 percent by weight.

EXAMPLE IX

To an eight-inch glass pressure tube cooled in a Dry Ice-acetone bath were charged, under a nitrogen atmosphere, 10 milliliters of isobutyraldehyde (0.11 mole), 1 milliliter of ethylene oxide (0.02 mole), and 2 milliliters of a solution of poly(ethylaluminum oxide) and vinyl n-butyl ether in methylene chloride [the solution being 0.88 molar with respect to the poly(ethylaluminum oxide) and prepared by admixing triethylaluminum water, and vinyl n-butyl ether in a 1:1:0.25 mole ratio in methylene chloride in a manner similar to Example I]

The tube was sealed and allowed to stand in the bath for five days. At the end of this time the bath had warmed to −30° C. The tube was opened and a mixture of equal volumes of methanol and methylene chloride was added to the contents thereof. The resulting mixture was filtered, and the precipitate collected was washed with hexane and dried at room temperature. About 4.2 grams of a tough, translucent copolymer of isobutyraldehyde and ethylene oxide were obtained.

After heating a sample portion of the copolymer in a forced air oven for 45 minutes at a temperature of 100° C., about 96 percent of the copolymer remained.

When 10 milliliters of isobutyraldehyde (0.11 mole) was homopolymerized in the same manner, 3.3 grams of homopolymer were obtained. After heating a sample portion of the homopolymer in a forced air oven for 45 minutes at a temperature of 100° C., only 88 percent of the homopolymer remained.

EXAMPLE X

To an eight-inch glass pressure tube cooled in a Dry Ice-acetone bath were charged, under a nitrogen atmosphere, 10 milliliters of isobutyraldehyde (0.11 mole), 0.5 milliliter of epoxycyclohexane (0.005 mole), 0.3 milliliter of the catalyst solution employed in Example IX, and 5 milliliters of isooctane as solvent. The tube was sealed and allowed to stand in the bath for two days. At the end of this time, the tube was opened and the solidified contents therein were removed and ground in a Waring Blendor with a mixture of 9 parts by volume of isooctane and 1 part by volume of pyridine. The resulting mixture was filtered, and the precipitate collected was washed with isooctane and dried at room temperature. About 5.5 grams of a tough, translucent copolymer of isobutyraldehyde and epoxycyclohexane were obtained.

After heating a sample portion of the copolymer in a forced air oven for 45 minutes at a temperature of 100° C., about 70 percent of the copolymer remained.

When the procedure was repeated employing 5 milliliters of diethyl ether as solvent in place of isooctane, 8.2 grams of copolymer were recovered. After heating a sample portion of the copolymer in a forced air oven for 45 minutes at a temperature of 100° C., about 70 percent of the copolymer remained.

When the procedure was again repeated employing 5 milliliters of toluene as solvent, 2.2 grams of copolymer were recovered.

When 5 milliliters of methylene chloride was employed as solvent, the yield of copolymer was 5.0 grams.

EXAMPLE XI

The procedure of Example X was repeated employing 10 milliliters of isobutyraldehyde (0.11 mole), 2 milliliters of styrene oxide (0.015 mole), 1 milliliter of the catalyst solution employed in Example IX, and 10 milliliters of isooctane as solvent. The polymerization was allowed to proceed for five days.

About 5.2 grams of a tough, translucent copolymer of isobutyraldehyde and styrene oxide were obtained. Infrared spectrophotometric analysis of the product indicated the epoxide comonomer had been incorporated therein. After continuous extraction for 24 hours with methylene chloride, which is a solvent for the epoxide homopolymer, the presence of polymerized epoxide in the product was still indicated by infrared analysis. This showed that the product was not a mixture of homopolymers.

After heating a 0.8020 gram portion of the copolymer in a forced air oven for 60 minutes at a temperature of 100° C., about 85 percent of the copolymer remained.

When the procedure was repeated employing 2 milliliters of 2,3-epoxybutane in place of the styrene oxide, 3.9 gram of a copolymer of isobutyraldehyde and 2,3-epoxybutane were recovered.

When the procedure was again repeated employing 2 milliliters of glycidyl acrylate as the epoxide comonomer, 7.4 grams of a copolymer of isobutyraldehyde and glycidyl acrylate were recovered. Infrared spectrophotometric analysis of the product indicated the epoxide comonomer had been incorporated therein. After heating a 0.6410 gram portion of the copolymer in a forced air oven for 60 minutes at a temperature of 100° C., about 66 percent of the copolymer remained.

When 6-methyl 3,4-epoxycyclohexylmethyl acetate was employed as the epoxide comonomer (2 milliliters), 5.5 grams of a copolymer of isobutyraldehyde and 6-methyl 3,4-epoxycyclohexylmethyl acetate were recovered. Infrared spectrophotometric analysis of the product indicated the epoxide comonomer had been incorporated therein. After continuous extraction for 24 hours with methylene chloride, the presence of polymerized epoxide in the product was still indicated by infrared analysis. After heating a 0.9098 gram portion of the copolymer in a forced air oven for 60 minutes at a temperature of 100° C., about 94 percent of the copolymer remained.

When 2,3-epoxycyclopentyl cyclopentyl ether was employed as the epoxide comonomer (2 milliliters), 5.2 grams of a copolymer of isobutyraldehyde and 2,3-epoxycyclopentyl cyclopentyl ether were recovered. After heating a 0.5330 gram portion of the copolymer in a forced air oven for 60 minutes at a temperature of 100° C., about 90 percent of the copolymer remained.

When 3,4-epoxyvinylcyclohexane was employed as the epoxide comonomer (2 milliliters), 2.5 grams of a copolymer of isobutyraldehyde and 3,4-epoxyvinylcyclohexane were recovered. Infrared spectrophotometric analysis of the product indicated the epoxide comonomer had been incorporated therein. After heating a 0.6832 gram portion of the copolymer in a forced air oven for 60 minutes at a temperature of 100° C., about 90 percent of the copolymer remained.

EXAMPLE XII

To an eight-inch glass pressure tube cooled in a Dry Ice-acetone bath were charged, under a nitrogen atmosphere, 10 milliliters of isobutyraldehyde (0.11 mole), 10 milliliters of epoxycyclohexane (0.10 mole), and 1 milliliter of a 0.1 molar solution of poly(ethylaluminum oxide) in methylene chloride (prepared by admixing triethylaluminum and water in a 1:1 mole ratio in methylene chloride in a manner similar to Example I). The tube was sealed and allowed to stand in the bath for two days. At the end of this time, the tube was opened and the solidified contents therein were removed and ground in a Waring Blendor with a mixture of 9 parts by volume of methylene chloride and 1 part by volume of pyridine. The resulting mixture was filtered, and the precipitate collected was washed with methanol and dried at room temperature. About 4.0 grams of a tough, translucent copolymer of isobutyraldehyde and epoxycyclohexane were recovered.

When the procedure was repeated employing 10 milliliters of 3-chloro-1,2-epoxypropane in place of the epoxycyclohexane, 2.5 grams of a copolymer of isobutyraldehyde and 3-chloro-1,2-epoxypropane were recovered. When the methylene chloride-pyridine filtrate was concentrated under vacuum to a small volume and poured into a large volume of methanol, about 1.5 grams of a rubbery, translucent polymer precipitated. The polymer was collected by filtration. Infrared spectrophotometric analysis indicated the presence of polymerized epoxide in this product as well as in the insoluble product. Quantitative analysis showed a chlorine content of 0.67 percent in the soluble product and 0.74 percent in the insoluble product, indicating the presence of about 2 percent by weight of 3-chloro-1,2-epoxypropane in each fraction.

EXAMPLE XIII

To an eight-inch glass pressure tube cooled in a Dry Ice-acetone bath were charged, under a nitrogen atmosphere, 10 milliliters of isooctane, 9.5 milliliters of isobutyraldehyde (0.105 mole), and 0.5 milliliter of epoxycyclohexane (0.005 mole). After the contents of the tube had cooled to −78° C., 1 milliliter of a 0.1 molar solution of poly(ethylaluminum oxide) in methylene chloride (prepared by admixing triethylaluminum and water in a 1:1 mole ratio in methylene chloride in a manner similar to Example I) was added under a nitrogen atmosphere. The tube was sealed and allowed to stand in the bath for five days. At the end of this time, the tube was opened and the solidified contents therein were removed and ground in a Waring Blendor with a mixture of 9 parts by volume of isooctane and 1 part by volume of pyridine. The resulting mixture was filtered, and the precipitate collected was washed with isooctane and dried at room temperature.

About 5.6 grams of a tough, translucent copolymer of isobutyraldehyde and epoxycyclohexane were obtained. Quantitative analysis showed a carbon content of 67.0 percent, indicating the presence of less than 4 percent by weight of epoxycyclohexane in the copolymer. After heating a 0.7090 gram portion of the copolymer in a forced air oven for 65 minutes at a temperature of 150° C., about 48 percent of the copolymer remained.

When the procedure was repeated employing 9.0 milliliters of isobutyraldehyde and 1.0 milliliter of epoxycyclohexane, 5.2 grams of copolymer were recovered. Quantitative analysis showed a carbon content of 67.1 percent, indicating the presence of less than about 7 percent by weight of epoxycyclohexane in the copolymer. After heating a 0.6130 gram portion of the copolymer in a forced air oven for 65 minutes at a temperature of 150° C., about 32 percent of the copolymer remained.

When the procedure was repeated employing 7.5 milliliters of isobutyraldehyde and 2.5 milliliters of epoxycyclohexane, 3.7 grams of copolymer were recovered. Quantitative analysis showed a carbon content of 66.9 percent, indicating the presence of about 4 percent by weight of epoxycyclohexane in the coplymer. After heating a 0.5750 gram portion of the copolymer in a forced air oven for 65 minutes at a temperature of 150° C., about 43 percent of the copolymer remained.

When the procedure was repeated employing 5.0 milliliters of isobutyraldehyde and 5.0 milliliters of epoxycyclohexane, 2.9 grams of copolymer were recovered. Quantitative analysis showed a carbon content of 67.8 percent, indicating the presence of about 17.6 percent by weight of epoxycyclohexane in the copolymer. After heating a 0.6080 gram portion of the copolymer in a forced air oven for 65 minutes at a temperature of 150° C., about 46 percent of the copolymer remained.

When the procedure was repeated employing 2.5 milliliters of isobutyraldehyde and 7.5 milliliters of epoxycyclohexane, 2.9 grams of copolymer were recovered. Quantitative analysis showed a carbon content of 70.4 percent, indicating the presence of about 56 percent by weight of epoxycyclohexane in the copolymer. After heating a 0.6030 gram portion of the copolymer in a forced air oven for 65 minutes at a temperature of 150° C., about 72 percent of the copolymer remained.

When the procedure was repeated employing 1.0 milliliter of isobutyraldehyde and 9.0 milliliters of epoxycyclohexane, 6.0 grams of copolymer were recovered. After heating a 0.6110 gram portion of the copolymer in a forced air oven for 65 miunutes at a temperature of 150° C., about 86 percent of the copolymer remained.

Three specimens of isobutyraldehyde homopolymer were prepared by the same procedure. After heating a sample portion of each of the specimens in a forced air oven for 60 minutes at a temperature of 150° C., only 2.8, 2.9 and 4.5 percent of the homopolymer remained in each instance.

What is claimed is:

1. A copolymer containing (a) from 10 mole percent to 99.99 mole percent of recurring oxide units of the formula

wherein R is a monovalent organic radical containing carbon and hydrogen atoms wherein the carbon atom adjacent the aldehyde moiety is aliphatic and wherein any elements present in addition to carbon and hydrogen are selected from the group consisting of oxygen and halogen, said radical having from 1 to 12 carbon atoms, with any oxygen present being selected from the group consisting of ether and ester, and (b) correspondingly from 90 mole percent to 0.01 mole percent of recurring oxide units of the formula

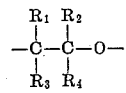

wherein $R_1$, $R_2$, $R_3$, and $R_4$, when taken individually, are each selected from the group consisting of hydrogen and monovalent organic radicals containing carbon and hydrogen atoms wherein any elements present in addition to carbon and hydrogen are selected from the group consisting of oxygen and halogen, said radicals each having from 1 to 12 carbon atoms, with any oxygen present being selected from the group consisting of ether and ester, while any two of $R_1$, $R_2$, $R_3$, and $R_4$, when attached to different carbon atoms and taken collectively, represent a divalent hydrocarbon radical which together with the terminal carbon atoms to which they are attached make up a monocyclic radical having from 4 to 10 carbon atoms, which monocyclic radical can be substituted with monovalent organic radicals containing carbon and hydrogen atoms wherein any elements present in addition to carbon and hydrogen are selected from the group consisting of oxygen and halogen, with any oxygen present being selected from the group consisting of ether and ester, provided, however, that the monocyclic radical and its substituents contain no more than 10 carbon atoms.

2. A copolymer as in claim 1 wherein R, $R_1$, $R_2$, $R_3$, and $R_4$ are free oxygen and halogen.

3. A copolymer containing (a) from 90 mole percent to 99.9 mole percent of recurring oxide units of the formula

wherein R is a monovalent organic radical containing carbon and hydrogen atoms wherein the carbon atom adjacent the aldehyde moiety is aliphatic and wherein any elements present in addition to carbon and hydrogen are selected from the group consisting of oxygen and halogen, said radical having from 1 to 4 carbon atoms, with any oxygen present being selected from the group consisting of ether and ester, and (b) correspondingly from 10 mole percent to 0.1 mole percent of recurring oxide units of the formula

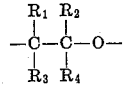

wherein $R_1$, $R_2$, $R_3$, and $R_4$, when taken individually, are each selected from the group consisting of hydrogen and monovalent organic radicals containing carbon and hydrogen atoms wherein any elements present in addition to carbon and hydrogen are selected from the group consisting of oxygen and halogen, said radicals each having from 1 to 6 carbon atoms, with any oxygen present being selected from the group consisting of ether and ester, while any two of $R_1$, $R_2$, $R_3$, and $R_4$, when attached to different carbon atoms and taken collectively, represent a ivalent hydrocarbon radical which together with the terminal carbon atoms to which they are attached make up a monocyclic radical having from 4 to 8 carbon atoms, which monocyclic radical can be substituted with monovalent organic radicals containing carbon and hydrogen atoms wherein any elements present in addition to carbon and hydrogen are selected from the group consisting of oxygen and halogen, with any oxygen present being selected from the group consisting of ether and ester, provided, however, that the monocyclic radical and its substituents contain no more than 10 carbon atoms.

4. A copolymer as in claim 3 wherein R, $R_1$, $R_2$, $R_3$, and $R_4$ are free of oxygen and halogen.

5. A copolymer containing from 90 mole percent to 99.9 mole percent of combined acetaldehyde and from 0.1 mole percent to 10 mole percent of combined ethylene oxide.

6. A copolymer containing from 90 mole percent to 99.9 mole percent of combined isobutyraldehyde and from 0.1 mole percent to 10 mole percent of combined ethylene oxide.

7. A copolymer containing from 90 mole percent to 99.9 mole percent of combined isobutyraldehyde and from 0.1 mole percent to 10 mole percent of combined epoxycyclohexane.

8. A copolymer containing from 90 mole percent to 99.9 mole percent of combined isobutyraldehyde and from 0.1 mole percent to 10 mole percent of combined styrene oxide.

9. A copolymer containing from 90 mole percent to 99.9 mole percent of combined isobutyraldehyde and from 0.1 mole percent to 10 mole percent of combined 2,3-epoxybutane.

10. A copolymer containing from 90 mole percent to 99.9 mole percent of combined isobutyraldehyde and from 0.1 mole percent to 10 mole percent of combined glycidyl acrylate.

11. A copolymer containing from 90 mole percent to 99.9 mole percent of combined isobutyraldehyde and from 0.1 mole percent to 10 mole percent of combined 6-methyl 3,4-epoxycyclohexylmethyl acetate.

12. A copolymer containing from 90 mole percent to 99.9 mole percent of combined isobutyraldehyde and from 0.1 mole percent to 10 mole percent of combined 2,3-epoxycyclopentyl cyclopentyl ether.

13. A copolymer containing from 90 mole percent to 99.9 mole percent of combined isobutyraldehyde and from 0.1 mole percent to 10 mole percent of combined 4-epoxyvinylcyclohexane.

14. A copolymer containing from 90 mole percent to 99.9 mole percent of combined isobutyraldehyde and from 0.1 mole percent to 10 mole percent of combined 3-chloro-1,2-epoxypropane.

15. A process which comprises contacting with a poly(hydrocarbylaluminum oxide) catalyst a mixture of (a) from 1 mole percent to 99 mole percent of an aldehyde which can be represented by the formula

R—CHO wherein R is a monovalent organic radical containing carbon and hydrogen atoms wherein the carbon atom adjacent the aldehyde moiety is aliphatic and wherein any elements present in addition to carbon and hydrogen are selected from the group consisting of oxygen and halogen, said radical having from 1 to 12 carbon atoms, with any oxygen present being selected from the group consisting of ether and ester, provided that such radical be free of vicinal epoxy groups, and (b) correspondingly from 99 mole percent to 1 mole percent of an epoxide which can be represented by the formula

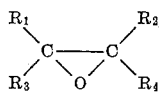

wherein $R_1$, $R_2$, $R_3$, and $R_4$, when taken individually, are each selected from the group consisting of hydrogen and monovalent organic radicals containing carbon and hydrogen atoms wherein any elements present in addition to carbon and hydrogen are selected from the group consisting of oxygen and halogen, such radicals each having from 1 to 12 carbon atoms, with any oxygen present being selected from the group consisting of ether and ester, provided that such radicals be free of vicinal epoxy groups, while any two of $R_1$, $R_2$, $R_3$, and $R_4$, when attached to different carbon atoms and taken collectively, represent a divalent hydrocarbon radical which together with the terminal carbon atoms to which they are attached make up a monocyclic radical having from 4 to 10 carbon atoms, which monocyclic radical can be substituted with monovalent organic radicals containing carbon and hydrogen atoms wherein any elements present in addition to carbon and hydrogen are selected from the group consisting of oxygen and halogen, with any oxygen present being selected from the group consisting of ether and ester, provided, however, that the monocyclic radical and its substituents contain no more than 10 carbon atoms and be free of vicinal epoxy groups.

16. A process as in claim 15 wherein the poly(hydrocarbylaluminum oxide) catalyst is poly(isobutylaluminum oxide).

17. A process as in claim 15 wherein the poly(hydrocarbylaluminum oxide) catalyst is poly(ethylaluminum oxide).

18. A process as in claim 15 wherein R, $R_1$, $R_2$, $R_3$, and $R_4$ are free of oxygen and halogen.

19. A process as in claim 18 wherein the poly(hydrocarbylaluminum oxide) catalyst is poly(isobutylaluminum oxide).

20. A process as in claim 18 wherein the poly(hydrocarbylaluminum oxide) catalyst is poly(ethylaluminum oxide).

21. A process which comprises contacting a mixture of (a) from 1 mole percent to 99 mole percent of an aldehyde which can be represented by the formula

R—CHO wherein R is a monovalent organic radical containing carbon and hydrogen atoms wherein the carbon atom adjacent the aldehyde moiety is aliphatic and wherein any elements present in addition to carbon and hydrogen are selected from the group consisting of oxygen and halogen, said radical having from 1 to 12 carbon atoms, with any oxygen present being selected from the group consisting of ether and ester, provided that such radical be free of vicinal epoxy groups, and (b) correspondingly from 99 mole percent to 1 mole percent of an epoxide which can be represented by the formula

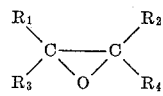

wherein $R_1$, $R_2$, $R_3$, and $R_4$, when taken individually, are each selected from the group consisting of hydrogen and monovalent organic radicals containing carbon and hydrogen atoms wherein any elements present in addition to carbon and hydrogen are selected from the group consisting of oxygen and halogen, such radicals each having from 1 to 12 carbon atoms, with any oxygen present being selected from the group consisting of ether and ester, provided that such radicals be free of vicinal epoxy groups, while any two of $R_1$, $R_2$, $R_3$, and $R_4$, when attached to different carbon atoms and taken collectively, represent a divalent hydrocarbon radical which together with the terminal carbon atoms to which they are attached make up a monocyclic radical having from 4 to 10 carbon atoms, which monocyclic radical can be substituted with monovalent organic radicals containing carbon and hydrogen atoms wherein any elements present in addition to carbon and hydrogen are selected from the group consisting of oxygen and halogen, with any oxygen present being selected from the group consisting of ether and ester, provided, however, that the monocyclic radical and its substituents contain no more than 10 carbon atoms and be free of vicinal epoxy groups, with a poly(hydrocarbylaluminum oxide) catalyst consisting of recurring units represented by the formula

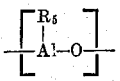

wherein $R_5$ is a radical selected from the group consisting of aryl, and alkyl radicals containing from 1 to 12 carbon atoms.

22. A process as in claim 21 wherein R, $R_1$, $R_2$, $R_3$, and $R_4$ are free of oxygen and halogen.

23. A process which comprises contacting a mixture of (a) from 30 mole percent to 80 mole percent of an aldehyde which can be represented by the formula

R—CHO wherein R is a monovalent organic radical containing carbon and hydrogen atoms wherein the carbon atom adjacent the aldehyde moiety is aliphatic and wherein any elements present in addition to carbon and hydrogen are selected from the group consisting of oxygen and halogen, said radical having from 1 to 4 carbon atoms, with any oxygen present being selected from the group consisting of ether and ester, provided that such radical be free of vicinal epoxy groups, and (b) correspondingly from 70 mole percent to 20 mole percent of an epoxide which can be represented by the formula

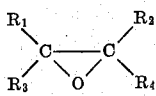

wherein $R_1$, $R_2$, $R_3$, and $R_4$, when taken individually, are each selected from the group consisting of hydrogen and monovalent organic radicals containing carbon and hydrogen atoms wherein any elements present in addition to carbon and hydrogen are selected from the group consisting of oxygen and halogen, such radicals each having from 1 to 6 carbon atoms, with any oxygen present being selected from the group consisting of ether and ester, provided that such radicals be free of vicinal epoxy groups, while any two of $R_1$, $R_2$, $R_3$, and $R_4$, when attached to different carbon atoms and taken collectively, represent a divalent hydrocarbon radical which together with the terminal carbon atoms to which they are attached make up a monocyclic radical having from 4 to 8 carbon atoms, which monocyclic radical can be substituted with monovalent organic radicals containing carbon and hydrogen atoms wherein any elements present in addition to carbon and hydrogen are selected from the group consisting of oxygen and halogen, with any oxygen present being selected from the group consisting of ether and ester, provided, however, that the monocyclic radical and its substituents contain no more than 10 carbon atoms and be free of vicinal epoxy groups, with a poly(hydrocarbylaluminum oxide) catalyst consisting of recurring units represented by the formula

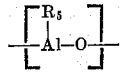

wherein $R_5$ is a radical selected from the group consisting of aryl, and alkyl radicals containing from 1 to 12 carbon atoms.

24. A process as in claim 23 wherein the poly(hydrocarbylaluminum oxide) catalyst is poly(isobutylaluminum oxide).

25. A process as in claim 23 wherein the poly(hydrocarbylaluminum oxide) catalyst is poly(ethylaluminum oxide).

26. A process as in claim 23 wherein R, $R_1$, $R_2$, $R_3$, and $R_4$ are free of oxygen and halogen.

27. A process as in claim 26 wherein the poly(hydrocarbylaluminum oxide) catalyst is poly(isobutylaluminum oxide).

28. A process as in claim 26 wherein the poly(hydrocarbylamuminum oxide) catalyst is poly(ethylaluminum oxide).

29. A process which comprises contacting a mixture of acetaldehyde and ethylene oxide with a poly(hydrocarbylaluminum oxide) catalyst.

30. A process which comprises contacting a mixture of isobutyraldehyde and ethylene oxide with a poly(hydrocarbylaluminum ovide) catalyst.

31. A process which comprises contacting a mixture of isobutyraldehyde and epoxycyclohexane with a poly (hydrocarbylaluminum oxide) catalyst.

32. A process which comprises contacting a mixture of isobutyraldehyde and styrene oxide with a poly(hydrocarbylaluminum oxide) catalyst.

33. A process which comprises contacting a mixture of isobutyraldehyde and 2,3-epoxybutane with a poly (hydrocarbylaluminum oxide) catalyst.

34. A process which comprises contacting a mixture of isobutyraldehyde and glycidyl acrylate with a poly (hydrocarbylaluminum oxide) catalyst.

35. A process which comprises contacting a mixture of isobutyraldehyde and 6-methyl 3,4-epoxycyclohexylmethyl acetate with a poly(hydrocarbylaluminum oxide) catalyst.

36. A process which comprises contacting a mixture of isobutyraldehyde and 2,3-epoxycyclopentyl cyclopentyl ether with a poly(hydrocarbylaluminum oxide) catalyst.

37. A process which comprises contacting a mixture of isobutyraldehyde and 3,4-epoxyvinylcyclohexane with a poly(hydrocarbylaluminum oxide) catalyst.

38. A process which comprises contacting a mixture of isobutyraldehyde and 3-chloro-1,2-epoxypropane with a poly(hydrocarbylaluminum oxide) catalyst.

References Cited

UNITED STATES PATENTS

| 2,870,100 | 1/1959 | Stewart et al. | 260—2 |
|---|---|---|---|
| 3,027,352 | 9/1962 | Walling et al. | 260—67 |
| 3,135,705 | 6/1964 | Vandenburg | 260—2 |
| 3,186,958 | 6/1965 | Kunter et al. | 260—2 |
| 3,192,173 | 6/1965 | Thorpe et al. | 260—2 |
| 3,215,673 | 11/1965 | Bastian | 260—67 |
| 3,221,059 | 11/1965 | Kukui et al. | 260—67 |
| 3,248,362 | 4/1966 | Perry | 260—67 |

FOREIGN PATENTS 876,956   9/1961   Great Britain.

OTHER REFERENCES

Colclough et al.: Journal of Polymer Science, vol. 34, 171–179, January 1959.

Saegusa et al.: Die Makromoleculare Chemie, vol. 55, 232–235, 1962.

WILLIAM H. SHORT, *Primary Examiner.*

SAMUEL H. BLECH, *Examiner.*

R. T. LYON, *Assistant Examiner.*